United States Patent [19]

Pinney

[11] 3,985,300

[45] Oct. 12, 1976

[54] SELF-PURGING INJECTION VALVE

[75] Inventor: Baden McDowall Pinney, Kingston, Canada

[73] Assignee: Du Pont of Canada Limited, Montreal, Canada

[22] Filed: Mar. 24, 1975

[21] Appl. No.: 561,437

[30] Foreign Application Priority Data

Aug. 1, 1974    Canada.............................. 206289

[52] U.S. Cl............................... 239/119; 137/239; 137/315; 137/625.48; 239/125
[51] Int. Cl.².......................................... B05B 15/02
[58] Field of Search........................... 137/237–241, 137/563, 625.48, 628, 625; 239/110, 112, 113, 119, 124, 125

[56] References Cited
UNITED STATES PATENTS

| | | | |
|---|---|---|---|
| 2,175,652 | 10/1939 | Trier et al............................ | 137/240 |
| 2,579,004 | 12/1951 | Joyce................................... | 239/125 |
| 3,587,970 | 6/1971 | Tindall et al........................ | 239/126 |
| 3,685,533 | 8/1972 | Krechel............................... | 137/628 X |

*Primary Examiner*—Alan Cohan
*Assistant Examiner*—Richard Gerard

[57] ABSTRACT

This invention discloses a self-purging injection valve comprising at least one supply port, at least one purging waste port, an injection port and an injection port barrel, the injection port barrel projecting from the injection port through the valve in communication with said supply port and purging waste port, and a valve stem having an internal passage and being adapted to slide within the injection port barrel between a purging position and an injection position, to seal the injection port, to block the direct flow of materials within the injection port barrel external to the valve stem between the supply port and the purging waste port, but to otherwise permit the flow of purging fluids from the supply port along the internal passage and about the valve stem within the injection port barrel to the purging waste port when said valve stem is in the purging position and to open the injection port and to permit the flow of materials from the supply port within and without the valve stem to the injection port when said valve stem is in the injection position, and a valve stem control means to control the movement of the valve stem, and a purging waste port control means to close the purging waste port in the injection position and to open the purging waste port in the purging position.

3 Claims, 6 Drawing Figures

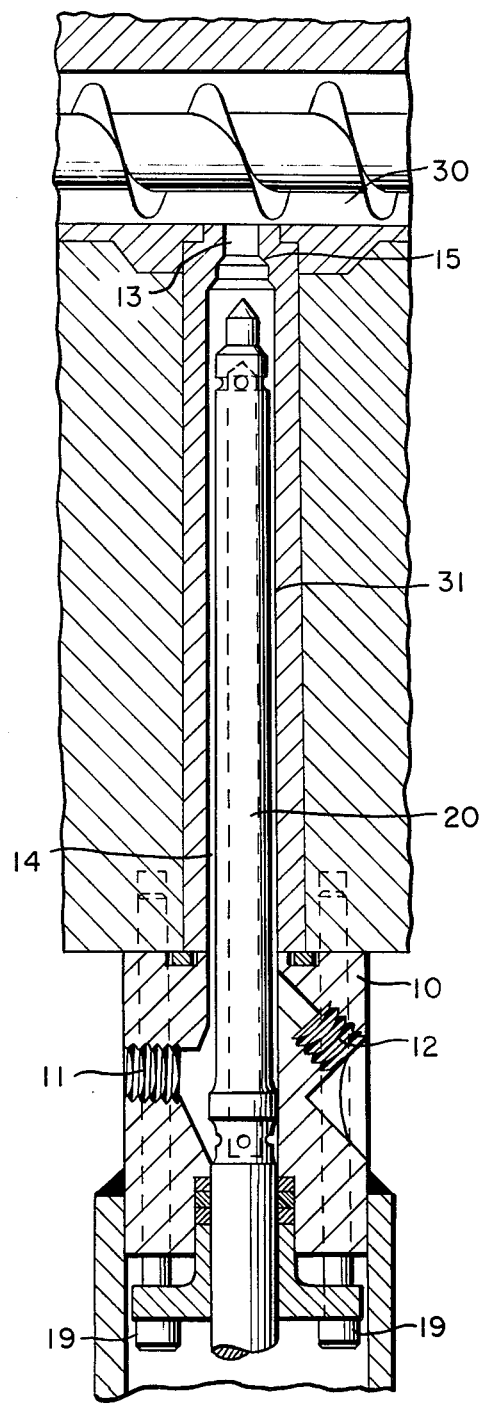
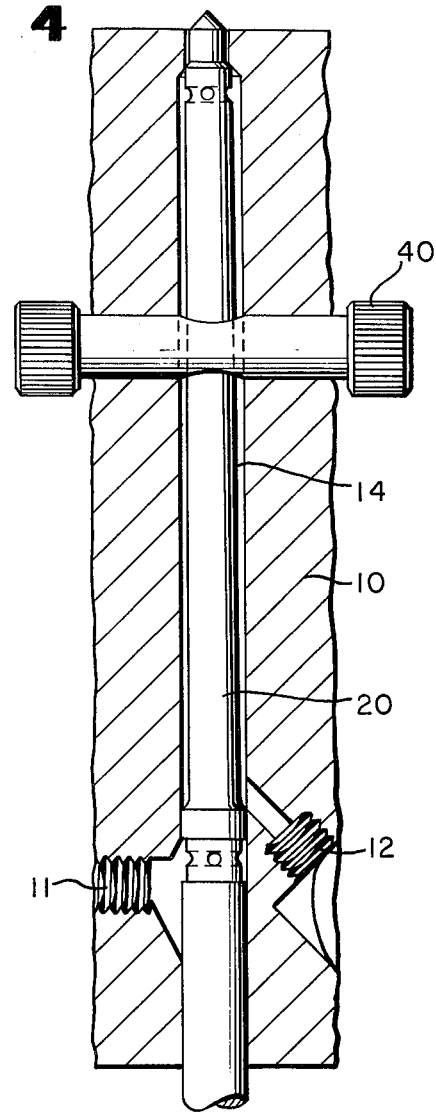
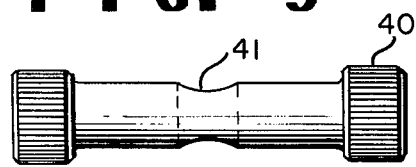
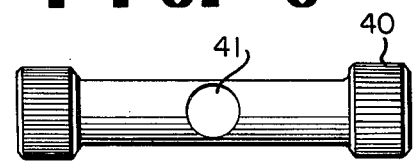

SELF-PURGING INJECTION VALVE

BACKGROUND OF THE INVENTION

This invention relates to a self-purging injection valve, in particular a self-purging injection valve adapted to inject additives into apparatus used in polymerization systems, for example, an extruder barrel or a polymerization vessel, and further adapted to be purged by steam during the course of its operation.

The prior art of valve design and fabrication teaches a number of valves which are useful for the regulation of fluid transfer within a variety of manufacturing operations. However, in some kinds of manufacture, for example, the production of thermoplastic polymers, the materials of manufacture may be susceptible to degradation during periods when they are not being actively processed, for example, during the period that such materials may be held up within a valve when the valve is temporarily closed.

It is an object of the present invention to provide a valve which may be purged of materials held up within it when the valve is in a closed position.

It is another object of this invention to provide a valve that may be conveniently installed in a thermocouple hole or such similar hole which may occur in a vessel used in the manufacture or processing of polymers, for example, a thermocouple hole in an extruder barrel of a polymerization system used in the manufacture of thermoplastic fibers.

SUMMARY OF THE INVENTION

In accordance with these objects the present invention provides a self-purging injection valve comprising:

at least one supply port, at least one purging waste port, an injection port and an injection port barrel, the injection port barrel projecting from the injection port through the valve in communication with said supply port and purging waste port, and a valve stem having an internal passage and being adapted to slide within the injection port barrel between a purging position and an injection position, said valve stem being adapted to seal the injection port, to block the direct flow of materials within the injection port barrel external to the valve stem between the supply port and the purging waste port, but to otherwise permit the flow of purging fluids from the supply port along the internal passage and about the valve stem within the injection port barrel to the purging waste port when said valve stem is in the purging position and to open the injection port and to permit the flow of materials from the supply port within and without the valve stem to the injection port when said valve stem is in the injection position, and a valve stem control means being adapted to control the movement of the valve stem, and a purging waste port control means being adapted to close the purging waste port in the injection position and to open the purging waste port in the purging position.

BRIEF DESCRIPTION OF THE DRAWINGS

FIG. 3 is a schematic view partly in cross section of the embodiment of FIG. 1 in a thermocouple hole in an extruder of a polymerization system.

FIG. 4 is a schematic view partly in cross section of another embodiment of this invention in which the valve is modified by the addition of a plug to permit dismantling and cleaning.

FIG. 5 is side view of the plug shown in FIG. 4.

FIG. 6 is top view of the plug of FIG. 4.

DETAILED DESCRIPTION OF THE PREFERRED EMBODIMENT

Figure 1:
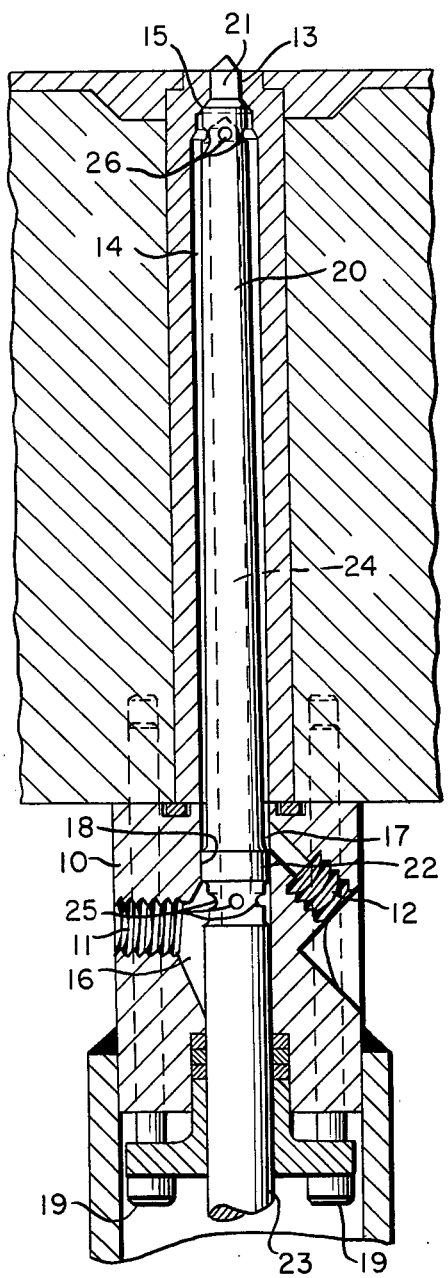
FIG. 1 is a schematic view partly in cross section of a preferred embodiment of the valve when the injection port is closed.

In the drawings, the valve body 10 comprises a supply port 11, a purging waste port 12, an injection port 13 and an injection port barrel 14. The injection port barrel 14 is fitted with a seat 15 about the injection port 13 to permit sealing. The supply port 11 meets the injection port barrel 14 at intersection 16 and the purging waste port 12 meets the injection port barrel 14 at intersection 17, the two intersections along the injection port barrel 14 being separated by the gate sealing surface 18.

The valve stem 20 illustrated comprises an injection port sealing head 21, a gate 22, a sealing rod 23 and an internal passage 24 having four inlets 25 in the intersection 16 and four outlets 26 near the injection port sealing head 21.

The valve stem control means and the purging waste port control means are known apparatus and are not shown in any of the drawings.

The valve operates essentially in one of two positions, an injection position and a purging position.

FIG. 1 illustrates the purging position in which the valve may be purged of materials that remain after closure of the injection port 13. In the position illustrated the supply port 11 may be connected to a source of purging fluid (not shown) so that purging fluid enters the supply port 11 to intersection 16. The injection port barrel 14 is sealed at the gate sealing surface 18 by the gate 22. The purging fluid therefore enters the four inlets 25 to the internal passage 24 within the valve stem 20 and passes out through the four outlets 26 near the injection port sealing head 21. The purging fluid then flows down through the space between the sides of the valve stem 20 and the injection port barrel 14 to the purging waste port 12, which is open at this valve stem position being controlled by the purging waste port control means (not shown). The purging fluid passes out the purging waste port 12 carrying with it material that may have remained in the valve after the injection port 13 was closed.

Figure 2:
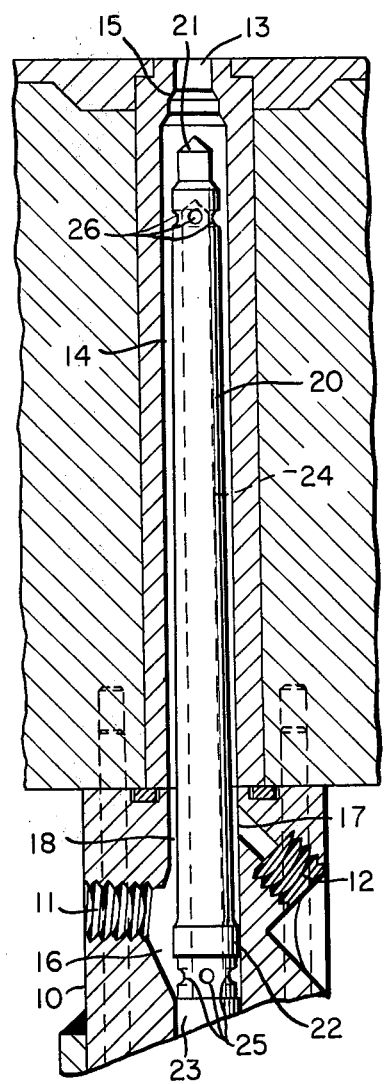
FIG. 2 is a schematic view partly in cross section of the embodiment of FIG. 1 when the injection port is open.

FIG. 2 illustrates the injection position in which materials may be added to a system. In the position illustrated the supply port 11 is connected to a source of materials (not shown) so that such materials enter the supply port 11 to intersection 16 which now contains both the gate 22 and the four inlets 25 to the internal passage 24. The materials pass the gate on both sides, part of the materials flowing through the internal passage 24 to the four outlets 26 near the injection port sealing head 21 which has been pulled back from the injection port 13 and the sealing seat 15, part of the materials flowing past the gate 22 between the valve stem 20 and the injection port barrel to merge with the flow from the internal passage 24 at the four outlets 26 and the merged flow of materials passing directly out the injection port 13 to the system (not identified).

The valve may be installed in a thermocouple hole that has been adapted to accommodate it such as that illustrated in FIG. 3. In that drawing the valve body 10 is bolted onto the extruder casing 30 with bolts 19 over the thermocouple hole 31 so that the injection port barrel 14 is partly made up of the thermocouple hole 31. The thermocouple hole is provided with a seat 15 about the injection port 13 to which the valve stem 20 is adapted.

Another embodiment of the valve of this invention is shown in FIG. 4 in which a plug 40 may be used to block the injection port barrel 14 when the valve stem 20 is removed for cleaning. The valve stem may then be replaced with a reaming device (not shown), without process shutdown, to remove any otherwise intractable materials that may have deposited within the injection port barrel.

FIGS. 5 and 6 further illustrate the plug 40 which is usually slightly tapered along its length with a hole 41 through its mid-portion. Thus the plug 40 may be turned on its axis to allow the valve stem 20 to pass through the hole 41 into the injection port barrel 14 or when the valve stem 20 is withdrawn the plug 40 may be turned on its axis to block the injection port barrel 14.

It will be understood that many details of construction may be varied through a wide range without departing from the principles of the invention. For example, the purging waste port control means and the valve stem control means may be merged into one control means or the purging waste control means might be replaced by a sealing means on the surface of the valve stem which would seal the purging waste port when the valve stem was withdrawn to the injection position. Further with gate designs different from that shown in the preferred embodiment the position of the supply and purging waste ports may be varied.

Also the inlets to the internal passage may be withdrawn beyond the intersection of the supply port and the injection port barrel when the valve stem is in the injection position so that materials would be blocked from entering the valve stem passage by the gate and would only flow to the injection port about the valve stem. The internal passage would then only be used for purging the valve when the valve stem was in the purging position.

It will be appreciated that the valve of this invention may also be used to extract samples from polymer systems rather than to inject additives.

What is claimed is:

1. In a valve including a valve body having a supply port and an injection port connected by an elongated injection port barrel passage and a valve stem extending through said barrel and slidable therein for closing and opening said injection port, the improvement comprising: said valve stem having an internal passage with outlets at one end adjacent said injection port and inlets at the other end adjacent said supply port; said body having a purging port in communication with said body barrel passage located between the supply port and the injection port; and sealing means on said valve stem for providing a flow passage from said supply port through the valve stem inlets into the internal passage of the valve stem, out through the valve stem outlets into the valve body barrel passage and out the purging port when the valve stem is in the position closing said injection port.

2. The valve as defined in claim 1, said sealing means being a sealing surface on said valve stem located between said inlets and purging port in the injection port closing position of said stem so that the waste purging port is not directly in communication with the supply port through the body barrel passage.

3. The valve as defined in claim 1, including a plug rotatable in said valve body and extending through said barrel passage, said plug being located between said supply and said injection ports and having a hole there through to allow passage of said valve stem.

* * * * *